US011636402B2

(12) United States Patent
Kuenzi et al.

(10) Patent No.: US 11,636,402 B2
(45) Date of Patent: Apr. 25, 2023

(54) ELECTRONIC RESERVATION SYSTEM

(71) Applicant: Carrier Corporation, Jupiter, FL (US)

(72) Inventors: Adam Kuenzi, Silverton, OR (US);
Amuduri Santhosh, Hyderabad (IN);
Ramesh Lingala, Hyderabad (IN)

(73) Assignee: Carrier Corporation, Palm Beach Gardens, FL (US)

( * ) Notice: Subject to any disclaimer, the term of this patent is extended or adjusted under 35 U.S.C. 154(b) by 756 days.

(21) Appl. No.: 16/208,648

(22) Filed: Dec. 4, 2018

(65) Prior Publication Data
US 2019/0171980 A1    Jun. 6, 2019

(51) Int. Cl.
*G06Q 10/00*      (2023.01)
*G06Q 10/02*      (2012.01)
*G06Q 20/32*      (2012.01)
*G06Q 20/20*      (2012.01)

(52) U.S. Cl.
CPC .......... *G06Q 10/02* (2013.01); *G06Q 10/00* (2013.01); *G06Q 10/025* (2013.01); *G06Q 20/20* (2013.01); *G06Q 20/322* (2013.01)

(58) Field of Classification Search
CPC .......... G06Q 10/02; G06Q 30/00; H04W 4/00
USPC ............................................................ 705/5
See application file for complete search history.

(56) References Cited

U.S. PATENT DOCUMENTS

| | | | |
|---|---|---|---|
| 7,328,166 B1* | 2/2008 | Geoghegan | G06Q 10/02 705/5 |
| 8,285,570 B2* | 10/2012 | Meyer | G06Q 50/14 705/5 |
| 8,600,784 B1* | 12/2013 | Ivey | G06F 16/00 705/5 |
| 2003/0004761 A1 | 1/2003 | Lampe et al. | |
| 2006/0015376 A1* | 1/2006 | Sattler | G06Q 10/109 705/5 |
| 2007/0271123 A1* | 11/2007 | Miyashita | G06Q 10/02 705/5 |
| 2008/0091396 A1* | 4/2008 | Kennon | E21B 43/26 703/10 |
| 2009/0030707 A1* | 1/2009 | Green | G06Q 50/16 705/313 |

(Continued)

FOREIGN PATENT DOCUMENTS

| | | |
|---|---|---|
| CN | 103714582 A * | 4/2014 |
| CN | 106940821 | 7/2017 |

OTHER PUBLICATIONS

Extended European Search Report for European Application No. 18152823.3-1222, completed Apr. 11, 2018.

*Primary Examiner* — Tonya Joseph
(74) *Attorney, Agent, or Firm* — Carlson, Gaskey & Olds, P.C.

(57) ABSTRACT

An electronic reservation method includes detecting that a user has utilized a first computing device in a transaction in which the user acquires an item, or acquires a voucher for a particular activity. An electronic reservation is created by a reservation server for the user based on the detecting that reserves one of a plurality of reservable locations within a predefined geographic area for the user. The plurality of reservable locations are configured for use of the item or for an activity related to but different than the particular activity. A credential for the electronic reservation is transmitted to a mobile computing device of the user.

20 Claims, 3 Drawing Sheets

(56) References Cited

U.S. PATENT DOCUMENTS

| | | | |
|---|---|---|---|
| 2009/0055029 A1* | 2/2009 | Roberson | G08B 21/00 |
| | | | 700/282 |
| 2010/0076862 A1* | 3/2010 | Lefkowitz | G06Q 10/02 |
| | | | 705/26.1 |
| 2011/0099037 A1* | 4/2011 | Levin | G06Q 10/02 |
| | | | 705/5 |
| 2011/0191253 A1 | 8/2011 | Pilskalns | |
| 2012/0095812 A1* | 4/2012 | Stefik | G06Q 10/00 |
| | | | 705/13 |
| 2015/0012307 A1* | 1/2015 | Moss | G06Q 10/02 |
| | | | 705/5 |
| 2015/0201306 A1* | 7/2015 | Kazemi | G01S 5/0252 |
| | | | 455/456.1 |
| 2017/0005945 A1* | 1/2017 | Kumar | H04N 21/478 |
| 2017/0161690 A1* | 6/2017 | Vitali | H04W 12/06 |
| 2017/0178034 A1 | 6/2017 | Skeen et al. | |

\* cited by examiner

ELECTRONIC RESERVATION SYSTEM

CROSS-REFERENCE TO RELATED APPLICATION

This application claims the benefit of Indian Provisional Patent Application No. 201711043645 which was filed on Dec. 5, 2017.

BACKGROUND

The present disclosure relates to electronic reservations, and more particularly to an electronic reservation system.

Shared public spaces are convenient places for people to read, meet, or work for a time period. Current methods for reserving a public space, such as sign-up sheets (whether in-person or over the phone with a representative), or just first-come-first-serve are cumbersome and can be frustrating for individuals seeking to make use of such public spaces. In a first-come-first serve system, for example, an individual may end up waiting hours for availability of a desired location due to factors such as unexpected peak usage and/or other patrons using the public spaces for lengthy periods of time.

SUMMARY

An example electronic reservation method includes detecting that a user has utilized a first computing device in a transaction in which the user acquires an item, or acquires a voucher for a particular activity. An electronic reservation is created by a reservation server for the user based on the detecting that reserves one of a plurality of reservable locations within a predefined geographic area for the user. The plurality of reservable locations are configured for use of the item or for an activity related to but different than the particular activity. A credential for the electronic reservation is transmitted to a mobile computing device of the user.

An example electronic reservation system includes a reservation server having memory storing electronic reservations for a plurality of reservable locations within a predefined geographic area, and a processor that is operatively connected to the memory. The processor is configured to detect that a user has utilized a first computing device in a transaction in which the user acquires an item, or acquires a voucher for a particular activity, and create an electronic reservation based on the detection that reserves one of the plurality of reservable locations within the predefined geographic area for the user. The plurality of reservable locations are configured for use of the item or for an activity related to but different than the particular activity. The processor is configured to transmit a credential for the electronic reservation to a mobile computing device of the user.

The embodiments, examples, and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

DETAILED DESCRIPTION

Figure 1:
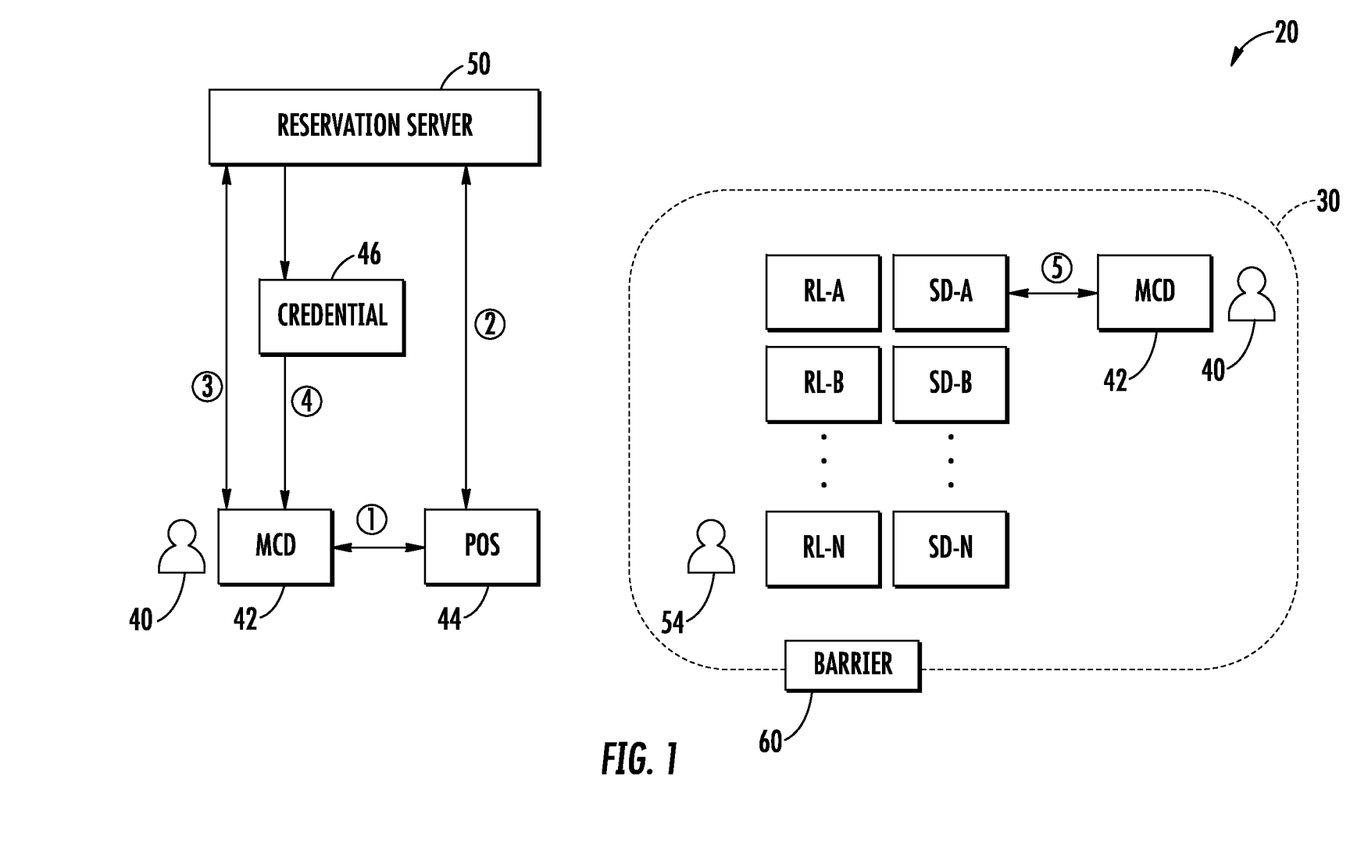
FIG. 1 schematically illustrates an example electronic reservation system.

FIG. 1 schematically illustrates an example electronic reservation system 20 that includes a plurality of reservable locations RL-A through RL-N within a predefined geographic area 30. Some example reservable locations could include dining areas (e.g., picnic tables or food court areas), athletic courts, reading spaces (e.g., park benches and/or library rooms), lodging sites, parking spaces, etc.

The electronic reservation system 20 includes a plurality of status devices SD-A through SD-N that include respective electronic outputs for indicating an availability of their corresponding reservable location RL. Although a one-to-one relationship between status devices SD and reservable locations RL is shown in the example of FIG. 1, it is understood that in other examples multiple reservable locations RL could share a single status device SD.

A user 40 utilizes a first computing device as part of a transaction. One example, which is depicted in FIG. 1, is the user 40 uses a mobile computing device 42 in a transaction at a point-of-sale terminal 44 (e.g., mobile computing device 42 is the "first computing device"). The transaction is schematically shown as (1) in FIG. 1. Some non-limiting examples of mobile computing devices 42 include a smartphone, a tablet computing device, and a laptop computing device. The mobile computing device 42 could be used to initiate the transaction and/or submit payment for the transaction, for example. Other non-limiting examples of transactions include payment via card without using the mobile computing device 42 (e.g., point-of-sale terminal 44 is the "first computing device") or purchasing items online through a website (e.g., client computer running web browser or web server is the "first computing device").

Although the user 40 is depicted as using the mobile computing device 42 in the transaction (1) of FIG. 1 and this use case is discussed below, this is a non-limiting example, and other non-mobile computing devices could be used, such as a desktop computing device. Also, as described above, the "first computing device" is not limited to being the mobile computing device 42.

An important element of the transaction is to identify the user 40 of the transaction (1). For example, when the mobile computing device 42 is used in the transaction, the user 40 can be identified by association with their mobile computing device 42 or an account of their mobile computing device 42. In the other examples, a user 40 may be identified by association with their payment card, or by use of a loyalty system, or by direct indication of the user 40 in the transaction (e.g. submitting an email address along with payment for a reservation).

In one example, the transaction (1) is for an item (e.g., food), and the plurality of reservable locations RL are configured for use of the item (e.g., dining areas). In another example, the transaction is for an activity voucher for a particular activity (e.g., hunting), and the plurality of reservable locations RL are configured for an activity related to but different than the particular activity (e.g., lodging areas for hunters). Of course, many other types of transactions and reservable locations RL could be used in the reservation system 20.

The transaction (1) provides a location-based social trigger that indicates that the user 40 may be interested in utilizing one of the plurality of reservable locations RL in conjunction with the transaction, and that triggers a reservation server 50 to offer a reservable location to the user 40. To utilize the food item example from above, if the reservable locations RL are dining areas, the purchase of the food item could indicate that user 40 may benefit from reserving one of the dining areas to consume their food item. The available dining areas that are reservable and offered to the user 40 may be prior associated with the location of the point-of-sale terminal 44. The time period for making the reservation may begin with the time when the transaction (1) occurred and may end with a pre-determined time duration after the beginning time, for example.

In one embodiment, the point-of-sale terminal 44 notifies the reservation server 50 about the transaction. This notification is schematically shown as (2) in FIG. 1. The reservation server 50 transmits a list of the reservable locations RL to the mobile computing device 42 that are available during a predefined time period. The mobile computing device 42 may be running an application that can communicate with the reservation server 50 and utilize the display of the mobile computing device 42 to present the options to the user 40 and allow them to make a reservable location selection.

The mobile computing device 42 in some examples sorts the list based on one or more criteria, such as a proximity of the user 40 to the reservable locations (e.g., closest locations higher in list than further locations), and a signal strength between the mobile computing device 42 and respective computing devices of the reservable locations (e.g., status devices SD).

In one example, the mobile computing device 42 uses wireless signaling between the mobile computing device 42 and the status device SD (e.g., using short range communication such as BLUETOOTH Low Energy "BTLE" or near-field communication "NFC"). In this example the mobile computing device 42 can identify the nearest status device, SD-B for example, that is associated with a reservable location RL-B, for example, and the user can select that nearest device SD-B on the display of the mobile computing device 42. This is convenient in a first come first serve situation and the user is standing next to an open table and wants to reserve it immediately. Further, in this example the mobile computing device could check with the reservation server (50) as to whether this particular SD-B is currently reserved (and waiting for someone to come) or as to the schedule of reservations already made for this status device.

The user 40 selects one of the reservable locations RL with their mobile computing device 42, and that selection is received at the reservation server 50. The transmission of reservable location and selection of a reservable location are schematically shown as (3) in FIG. 1. For discussion below, assume that the user 40 selects reservable location RL-A.

In one example, the reservation server 50 has one or more default reservable locations for a given item or activity voucher that are initially suggested to a user, and one or more non-default reservable locations that may also be selected. For example, a tennis court may be the default location for rented tennis equipment, but may be a backup location for volleyball if a volleyball court is already reserved.

The reservation server 50 identifies the user 40 from the transaction (1), and creates an electronic reservation for the user 40 utilizing the selected location (3) that reserves the reservable location RL-A for a predefined time period based on the location-based social trigger provided by the transaction (1). The reservation server 50 transmits a credential 46 to the mobile computing device 42 for utilizing the electronic reservation. The credential 46 transmission is schematically shown as (4) in FIG. 1. In some examples, the registration server 50 also provides a location of the particular reserved location that corresponds to the credential in conjunction with the transmission (4) using coordinates, or a predefined area with a radius with respect to coordinates, for example.

Although the reservation server 50 and point-of-sale terminal 44 are depicted as separate in FIG. 1, it is understood that in some examples the reservation server 50 and point-of-sale system 44 are the same and the notification (2) may be of a form internal to the combined system.

The user 40 arrives at the reservable location RL-A and uses the credential 46 to authenticate with status device SD-A. That authentication is schematically shown as (5) in FIG. 1. In one example the authentication (5) uses wireless signaling between the mobile computing device 42 and the status device SD (e.g., using short range communication such as BLUETOOTH Low Energy "BTLE" or near-field communication "NFC"). In one such example, the status device SD-A may be 'offline' and not able to communicate with the reservation server 50. In this example, the status device SD-A determines the result of the authentication itself and also determines the current status of the reservable location RL-A based upon the credential 46.

In the same or another example, the authentication (5) uses wireless signaling between the mobile computing device 42 and the reservation server 50 (e.g., using an 802.11 based standard such as WI-FI or a cellular communication standard such as Long Term Evolution "LTE"). In this example, the status device SD-A may be 'online' and be able to communicate with the reservation server 50. Further, in this example, the reservation server 50 may communicate to the status device SD-A the result of the authentication and the current status of the reservable location RL-A.

The authentication (5) ensures that the user 40 possesses a valid credential 46 for an electronic reservation for the reservable location RL-A the user 40 is trying to utilize. For example, the authentication verifies that the user 40 has the proper credential 46 and has not waited too long to use the reservable location RL-A, and/or has not arrived too early to the reservable location RL-A.

The credential 46 may be of various forms. One example credential 46 is a password. Another example credential 46 is a digital certificate with a cryptographically verifiable digital signature where the certificate optionally contains one or more of the following, in any combination: information such as an identifier of user 40, an identifier of reservable location RL-A, an identifier of the status device SD-A, an indication of the status of the reservable location RL-A, programming instructions for status device SD-A, time-period of validity (start/end/duration/one-time/etc.) of the credential 46 authorized use, indication of resources associated with RL-A that the user 40 has additional authorization to utilize, geographic coordinates of the status device SD-A or reservable area RL-A, information about the transaction (1), and/or any other information associated with the user 40 or reservable location RL-A and credential systems.

In one example, the authentication (5) fails if the user 40 tries to utilize their electronic reservation outside of their predefined time period. For example, if a dining area is reserved for the user 40 for 30 minutes on day 1, but the user 40 tries to redeem the reservation on day 2, the status device SD-A or the reservation server 50 may reject the authentication of the credential 46. In such an example, the electronic reservation may be cancelled if the authentication does not occur before a predefined cut-off time, which frees up the reservable locations RL for other users. The cut-off time may be contained as information in the credential 46. Or, the cut-off time may be defined as a predefined time period after the beginning of validity of the credential 46. The electronic reservation may be cancelled by rejecting the authentication (5) if the authentication (5) is attempted by the user 40 with the mobile device 42 after the cut-off time and was not attempted at all before the cut-off time. In one example, the mobile computing device 42 notifies the user 40 that the credential 46 has expired with an alert to their mobile computing device 42 even prior to the user 40 attempting to authenticate with the status device SD-A.

In one example of the authentication (5), the status device SD obtains the credential 46 from the mobile computing device 42 and transmits the credential 46 to the reservation server 50 for comparison. In another example, the status device SD compares the credential 46 against a copy of the credential 46 that is locally stored at the status device SD. In another example, the status device SD compares the identifiers and information stored in the credential 46 against matching identifiers and information stored in the status device SD. In one example the reservation server 50 returns the result of the authentication (5) back to the status device SD. In another example, the status device SD determines the result of the authentication (5) locally without any communication to the reservation server 50. The validation of the credential 46 may include verifying the validity of digital signatures, verifying the time period of validity of the credential, and/or verifying the matching of identifiers, etc.

If the authentication (5) is successful, an electronic output of the status device SD-A is updated to indicate that the reserved location RL-A is in use. The electronic output could be an availability indicator such as a light-emitting diode (LED) or a liquid-crystal display (LCD), for example. In one example, the status devices SD use a first indicator when their corresponding reservable location RL is in use (e.g., a first color) and a second indicator when their corresponding reservable location RL is available (e.g., a different second color). In another example, the output could be a relay for driving equipment, such as a parking lot entrance barrier. In another example, the output could be of a form to enable other resources associated with the reserved location RL.

There are many different use cases for the electronic reservation system 20. One example is the dining area example discussed above, in which the transaction (1) includes the sale of a food item to the user 40, and the plurality of reservable locations RL include dining areas, such as picnic tables, food court tables, etc. The reservable locations RL are within a pre-defined geographic area associated with the sale location and a time period for the electronic reservation is determined based on the time of the transaction and a pre-determined amount of time for using a table to eat, for example. In another example, the time period is indefinite and starts with the time of the transaction (1) and ends when the person leaves the geographic area associated with the reservable location RL. After the electronic reservation ends or is canceled, the reservable location RL status is returned back to available.

In another example, the transaction (1) includes a rental, and the plurality of reservable locations RL are areas configured for utilizing the rented item. For example, the rental items could include an athletic device such as tennis racquets, and the reservable location could be a tennis court. In this example, the available reservable locations may be determined by association with the business that is offering the rental instead of a single, specific geographic area and the available locations may be limited only by what is 'nearby' the user 40 with the ability to search farther and farther away and at a later time until an available reservable location RL is identified (e.g., a larger geographic area that include a plurality of sets of reservable locations). In another example, the rental item is a book or film, and the reservable location RL is configured for reading a book (e.g., a park bench) or for viewing a film (e.g., audio-visual room of library). In this regard, the point-of-sale terminal 44 could conduct rentals instead of sales.

In one example, the transaction (1) is for rental of a lodging area (e.g., a hotel room), and the reservable location is a parking space in proximity to the lodging area. In this and other examples, the reservation may be booked for a duration that is the same length as the rental.

In another example, the transaction (1) includes purchase of an activity voucher for an activity in the predefined geographic area 30, and the plurality of reservable locations are configured for an activity related to but different than the particular activity. In one example, the voucher is a hunting license, and the reservable locations RL are camping sites for hunters. In this example, the available camping site reservable locations RL may be within a specified allowed hunting area and reservable for the duration of the hunt. In another example, the voucher is a ticket for an event (e.g., a concert), and the reservable locations RL are parking spaces for the event. In one example, the voucher is an electronic voucher that can also be redeemed using the mobile computing device 42.

In one example, the reservation server 50 enables a resource of the reservable location RL based on the authentication of the credential 46 held by the mobile computing device 42. For example, if the reservable location RL is a lodging area, the resource that is enabled could include a power hookup at the lodging area or a water source at the camping area. In this regard, use of such resources could be limited to those who have actually reserved the reservable location RL, and could be otherwise prevented by those who lack a valid credential 46 for the reservable location RL.

Figure 2:
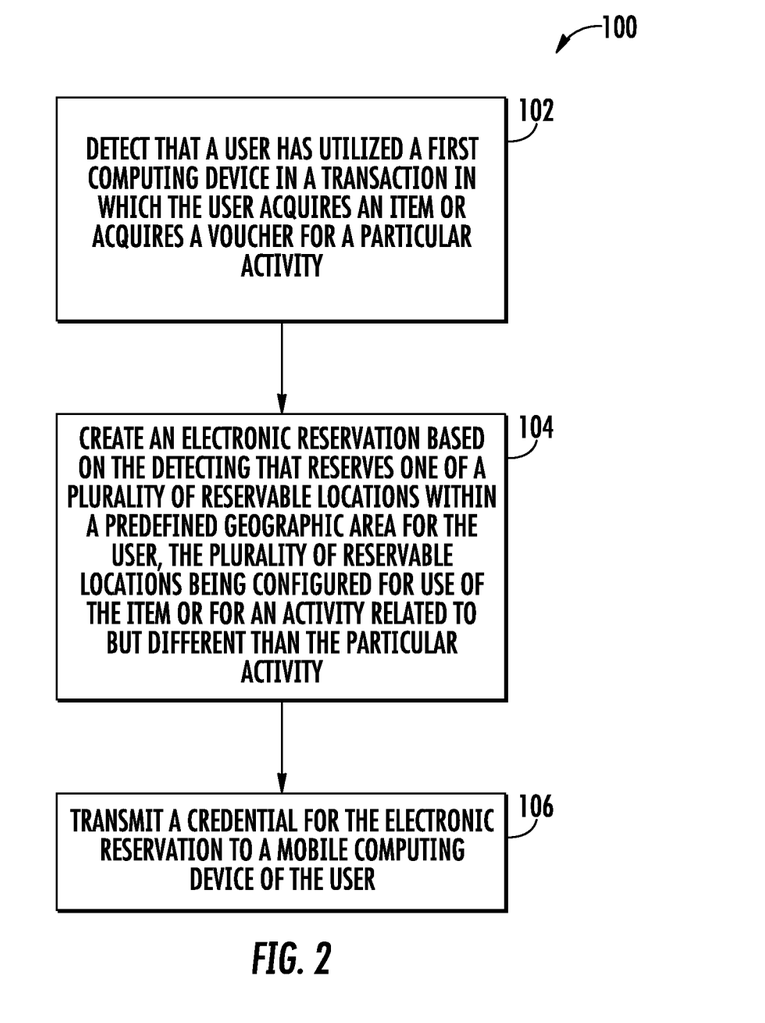
FIG. 2 is a flowchart representative of an example computer-implemented method for creating electronic reservations.

FIG. 2 is a flow chart representative of an example electronic reservation method 100 that may be implemented by one or more computing devices, such as the reservation server 50. The computing device detects that the user 40 has utilized a first computing device (e.g., mobile computing device 42) in a transaction in which the user 40 acquires an item or acquires a voucher for a particular activity (block 102). The computing device creates an electronic reservation based on the detecting that reserves one of a plurality of reservable locations RL within predefined geographic area 30 for the user 40 (block 104). The computing device transmits a credential 46 for the electronic reservation to the mobile computing device 42 of the user 40 (block 106), and optionally also transmits coordinates of the reserved location (e.g., address information or GPS coordinates). The transmission performed by the computing device in block 106 could include a computing device possessing the credential itself and transmitting the credential itself, or could include the computing device initiating the transmission by commanding another device to obtain and transmit the credential.

In one example, the creation of the electronic reservation is based on the user 40 being within the predefined geographic area 30, or being within a predefined distance to the geographic area. For example, a food court administrator may wish to only allow customers that are at or within a close proximity to the food court to reserve a reservable location.

In other examples, the electronic reservation can be created even if the user is remote from the geographic area. This could be useful if the user 40 is purchasing a ticket at home for a future event online, for example.

Some reservable locations may be suitable for sharing, and the reservation server 50 may promote sharing between users that know each other. In one example, the user 40 is linked to a user 54 that is currently utilizing an electronic reservation for reservable location RL-N. Such a link could be determined based on a social network in which the users 40, 54 are connected and/or based on a user database, for example. In one such example, the reservation server 50 transmits a request to the user 54 to share their electronic reservation with the user 40, and, if the user 54 accepts, the reservation server 50 transmits a credential 46 for utilizing the reservable location RL-N to the user 40 to share the reservation. The request for sharing is initiated by the user 40 in one example.

In one example, the reservation server 50 also controls access to the predefined geographic area through an entrance barrier 60, such as a parking lot barrier (e.g., a rotatable entrance arm). In one such example, the reservation server 50 requires authentication of the credential 46 prior to opening the barrier 60 to let the user 40 enter the predefined geographic area 30 (e.g., by blocking their vehicle unless a successful authentication is achieved). In one example, the entrance barrier 60 may respond to the same credential 46 that is provided for a reservable location RL within the geographic area associated with the entrance barrier 60. In another example, a separate credential 46 may be provided for the barrier 60 from the credential 46 that is provided for the reservable location RL. In one example, there may be a status device SD with an output of the form capable to drive the barrier 60.

In one example, a ranking system is implemented for the reservable locations RL, with a subset of the reservable locations RL being reserved for users having a higher rank than other users. This could be used for prioritizing parking or social areas reservations for professors over students, for example. In one such example, the reservation server 50 determines that the user 40 has a first rank in a user database, and excludes the user 40 from reserving an unreserved one of the reservable locations RL that requires a second rank that is higher than the first rank.

Although FIG. 1 depicts a particular example, it is understood that the example is non-limiting, and that many other examples are within the contemplation of this disclosure. In one example, the mobile computing device 42 acts as its own point of sale (e.g., through a website or downloaded application) and the point-of-sale terminal 44 is omitted or is a website providing point-of-sale services, a web service that is callable from a mobile app for providing point-of-sale transactions or purchases, or the point-of-sale terminal 44 is combined with the reservation server 50.

Figure 3:
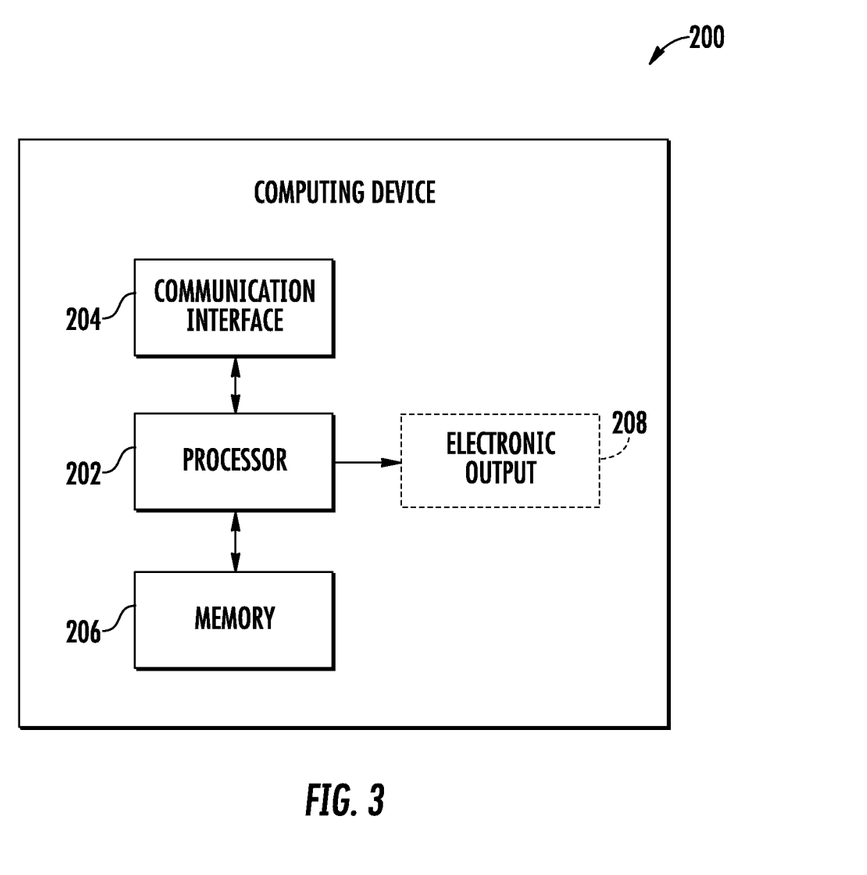
FIG. 3 schematically illustrates an example computing device that can be used in the electronic reservation system of FIG. 1.

FIG. 3 schematically illustrates an example computing device 200 that can be used in the electronic reservation system 20 of FIG. 1. For example, the computing device 200 could be used as the mobile computing device 42, the reservation server 50, and/or one of the status devices SD.

The computing device 200 includes a processor 202 that is operatively connected to a communication interface 204 and to memory 206. Optionally, the processor 202 is also operatively connected to an electronic output 208 which may be an electronic display or LED, for example.

The processor 202 may include one or more microprocessors, microcontrollers, application specific integrated circuits (ASICs), or the like, for example, configured to implement program instructions to implement one or more features discussed above. In one example, the computing device 200 is used as the reservation server 50, and is configured to implement the method 100.

The communication interface 204 is used to communicate with other computing devices, and may include a wired or wireless transceiver, for example, such as one configured to utilize WI-FI or another form of wireless communication, and/or configured to conduct short-range communication (e.g., BTLE or NFC).

The memory 206 can include any one or combination of volatile memory elements (e.g., random access memory (RAM, such as DRAM, SRAM, SDRAM, VRAM, etc.)) and/or nonvolatile memory elements (e.g., ROM, hard drive, tape, CD-ROM, etc.). Moreover, the memory 206 may incorporate electronic, magnetic, optical, and/or other types of storage media. The memory 206 can also have a distributed architecture, where various components are situated remotely from one another, but can be accessed by the processor 202.

In the case of the reservation server 50, the memory 206 could be used to store credentials 46, records of electronic reservations, and/or a user database, for example.

In the example of one of the status devices SD, the electronic display 208 provides a status indicator indicating an availability of a corresponding reservable location RL.

The electronic reservation system 20 described above provides a number of benefits by promoting use of shared spaces, and by doing so in a fashion that is convenient for users. In one example, the electronic reservation system 20 helps ensure that patrons do not use a reservable location for an unreasonable length of time, by permitting other users to reserve the reservable location and verify whether the patron has extended their use beyond their electronic reservation. This verification feature could be useful to resolve disputes between patrons regarding who should be able to utilize a reservable location.

Although example embodiments have been disclosed, a worker of ordinary skill in this art would recognize that certain modifications would come within the scope of this disclosure. For that reason, the following claims should be studied to determine the scope and content of this disclosure.

What is claimed is:

1. A method of reserving and controlling access to a plurality of reservable locations within a predefined geographic area, comprising:
   detecting that a user has utilized a first computing device in a transaction in which the user acquires an item, or acquires a voucher for a particular activity;
   creating, by a reservation server, an electronic reservation based on the detecting that reserves one of the plurality of reservable locations within the predefined geographic area for the user, the plurality of reservable locations being configured for use of the item or for an activity related to but different than the particular activity;
   transmitting a credential for the electronic reservation to a mobile computing device of the user;
   electronically authenticating the credential through wireless signaling with the mobile computing device when the mobile computing device is at an entrance barrier to the predefined geographic area; and
   controlling, by the reservation server, the entrance barrier to the predefined geographic area based on said authenticating, wherein controlling the entrance barrier comprises moving the entrance barrier to provide the user access to the predefined geographic area.

2. The method of claim 1, wherein said creating an electronic reservation comprises:
transmitting a list of available ones of the plurality of reservable locations to the user;
receiving a selection of a reservable location from the list from the user; and
reserving the selected reservable location for the user.

3. The method of claim 1, wherein the first computing device and the mobile computing device of the user are the same, and said creating an electronic reservation is performed based on the mobile computing device being within a predefined distance to the predefined geographic area when the transaction occurs.

4. The method of claim 1, comprising:
displaying an availability of the plurality of reservable locations using an electronic output of one or more status devices in the predefined geographic area.

5. The method of claim 4, comprising:
performing said authenticating the credential through wireless signaling with the mobile computing device when the mobile computing device is at the reserved location; and
updating the availability of the reserved location on the electronic output based on said authenticating to indicate that the reserved location is in in use.

6. The method of claim 5, comprising:
enabling a resource of the reservable location based on said authenticating.

7. The method of claim 1, comprising:
canceling the electronic reservation if the credential of the mobile computing device is not authenticated at the reservable location before a predefined cut-off time.

8. The method of claim 1, comprising:
transmitting a request to an additional user that has an existing electronic reservation for one of the reservable locations to share their electronic reservation;
wherein said creating an electronic reservation adds the user to the existing electronic reservation based on acceptance to the request by the additional user.

9. The method of claim 1, comprising:
determining that the user has a first rank in a user database; and
excluding the user from reserving an unreserved one of the reservable locations that requires a second rank that is higher than the first rank.

10. A system for reserving and controlling access to a plurality of reservable locations within a predefined geographic area, comprising:
a reservation server comprising memory storing electronic reservations for the a-plurality of reservable locations within the predefined geographic area, and a processor operatively connected to the memory;
the processor configured to:
detect that a user has utilized a first computing device in a transaction in which the user acquires an item, or acquires a voucher for a particular activity;
create an electronic reservation based on the detection that reserves one of the plurality of reservable locations within the predefined geographic area for the user, the plurality of reservable locations being configured for use of the item or for an activity related to but different than the particular activity; and
transmit a credential for the electronic reservation to a mobile computing device of the user;

wherein the processor of the reservation server or a processor of a status device in proximity to the predefined geographic area is configured to:
electronically authenticate the credential through wireless signaling with the mobile computing device when the mobile computing device is at an entrance barrier to the predefined geographic area; and
control the entrance barrier to the predefined geographic area based on the authentication, wherein to control the entrance barrier the processor is configured to move the entrance barrier to provide the user access to the predefined geographic area.

11. The system of claim 10, wherein as part of creating the electronic reservation, the processor of the reservation server is configured to:
transmit a list of available ones of the plurality of reservable locations to the user;
receive a selection of a reservable location from the list from the user; and
reserve the selected reservable location for the user.

12. The system of claim 11, wherein the list is transmitted to one of the first computing device and the mobile computing device, and the one of the first computing device and mobile computing device is configured to:
sort the list based on one or both of a proximity of the reservable locations to a current location of the user, and a signal strength between the mobile computing device and respective computing devices of the reservable locations;
display the sorted list; and
transmit the selection to the reservation server.

13. The system of claim 10, wherein the first computing device and the mobile computing device of the user are the same, and the processor of the reservation server is configured to create the electronic reservation based on the mobile computing device being within a predefined distance to the predefined geographic area when the transaction occurs.

14. The system of claim 10, comprising:
a status device within the predefined geographic area and comprising an electronic output configured to indicate an availability of one or more of the plurality of reservable locations.

15. The system of claim 14, wherein:
the processor of the status device or the processor of the reservation server is configured to authenticate the credential through wireless signaling with the mobile computing device when the mobile computing device is at the reserved location; and
the status device is configured to update its electronic output based on the authentication to indicate that the reserved location is in in use.

16. The system of claim 15, wherein the processor of the reservation server or the processor of the status device is configured to:
enable a resource of the reservable location based on the authentication.

17. The system of claim 10, wherein the processor of the reservation server is configured to:
cancel the electronic reservation if the credential of the mobile computing device is not authenticated at the reservable location before a predefined cutoff time.

18. The system of claim 10, wherein the processor of the reservation server is configured to:
transmit a request to an additional user that has an existing electronic reservation for one of the reservable locations to share their electronic reservation;

wherein creation of the electronic reservation adds the user to the existing electronic reservation based on acceptance to the request by the additional user.

19. The method of claim 1, wherein the entrance barrier is a parking lot entrance barrier.

20. The system of claim 10, wherein the entrance barrier is a parking lot entrance barrier.

\* \* \* \* \*